Sept. 13, 1932.    T. J. DUGAN    1,876,821
SOLDERING APPARATUS
Filed May 3, 1929    7 Sheets-Sheet 1

FIG.-1

Inventor
Thomas J. Dugan
By Bates, Golrick & Teare
Attorneys

Sept. 13, 1932. T. J. DUGAN 1,876,821
SOLDERING APPARATUS
Filed May 3, 1929 7 Sheets-Sheet 2

FIG.-2

Inventor
Thomas J. Dugan
By Bates, Goldrick & Teare
Attorneys

Inventor
Thomas J. Dugan
By Bates, Golrick & Teare
Attorneys

Inventor
Thomas J. Dugan
By Bates, Golrick & Teare
Attorneys

Sept. 13, 1932. T. J. DUGAN 1,876,821
SOLDERING APPARATUS
Filed May 3, 1929 7 Sheets-Sheet 7

Inventor
Thomas J. Dugan
By Bates, Golrick & Teare
Attorneys

Patented Sept. 13, 1932

1,876,821

UNITED STATES PATENT OFFICE

THOMAS J. DUGAN, OF LAKEWOOD, OHIO, ASSIGNOR TO MARTIN J. O'DONNEL, OF LAKEWOOD, OHIO

SOLDERING APPARATUS

Application filed May 3, 1929. Serial No. 360,086.

This invention relates to a soldering apparatus which is especially adapted to solder dispensing outlets, such as screw top spouts or nozzles onto tin cans. Heretofore the dispensing outlets have been manually soldered to the can bodies. A previously tinned spout or nozzle was placed in position on the can by the operator who then applied a soldering iron while retaining the nozzle in position on the can and thereafter he removed the iron from the can and chilled the solder, and he then removed the retaining means. Other manufacturing methods have been tried but with little success, for this operation must be performed without burning or marring the can, and the use of gas jets or similar apparatus frequently mars the product. Great difficulties also have been encountered in the use of electric irons, even when the entire operation is manual due to the fact that the irons chill rapidly and must remain in contact with the can a considerable length of time, thereby causing a loss of time. It is evident, of course, that hand operations necessarily are slow and therefore this operation of soldering the spouts onto the can is costly when compared to the manufacturing cost of the entire can, especially in view of the fact that the can bodies are formed entirely by automatic machinery. The primary object of this invention, therefore, is to provide an apparatus which may function automatically in soldering the nozzles or other dispensing outlets onto the cans in such a manner as to prevent any burning or mutilating of either the can or outlet and while doing so operate at a comparatively high rate of speed.

One of the objects of this invention is to provide an apparatus which will solder previously formed dispensing outlets such as nozzles or screw tops on tin cans without necessitating any manual operation upon either the can or outlet. Another object is to provide a soldering apparatus which is adapted to take the can from a belt conveyor such as usually is used in connection with the discharge of the cans from the can body forming apparatus and then solder a dispensing outlet on each can and discharge the finished can from the apparatus without necessitating the use of manual labor. Another object is to provide a soldering apparatus of such construction that the cans may be accurately positioned in such a manner that nozzles or other dispensing outlets may readily be brought into alignment with a previously formed opening in the can body and then be soldered onto the can. A further object is to provide an apparatus adapted to solder dispensing outlets or handles or the like onto a can body, the apparatus being adapted for use in connection with cans of various shapes and sizes. Another object of the invention is to provide an apparatus automatic in operation and which is adapted to solder dispensing outlets, handles or the like on can bodies and which may utilize an electric soldering iron for the soldering operation.

Other objects of my invention will hereinafter become apparent from the following description which refers to the accompanying drawings illustrating a preferred embodiment thereof, and the essential characteristics thereof are summarized in the claims.

My invention contemplates the provision of a series of coordinated mechanisms adapted to magnetically lift a previously formed part from a suitable conveyor, carry the part into contact with a flux applicator, then lower the part into a container of molten solder. Can bodies are then fed to mechanisms and accurately positioned and gripped thereby in a predetermined relation to the parts. The mechanisms then bring the parts in contact with the can bodies and suitable electrically heated irons are provided to keep the solder melted until a weld between the part and the body has taken place at which time the joint is cooled and the product is discharged from the mechanisms.

In the embodiment illustrated I have shown eight of these mechanisms thereby causing the apparatus to operate on eight cans at the same time some one of the aforementioned operations being performed on each can. It is contemplated, however, that more of these mechanisms may be used to increase the output of the apparatus as desired.

As illustrated in the drawings the preferred embodiment of my apparatus comprises a feeding mechanism generally indicated at 10 which is adapted to feed can bodies 12 which are carried by a continuous belt conveyor 15 of the usual type, which is employed to convey the can bodies away from the can body forming apparatus. The feeding mechanism 10 is adapted to operate in timed relation to the soldering apparatus generally indicated at 20 which comprises a series of coordinated mechanisms 23 each adapted to receive a dispensing outlet or other part and solder it to a can body. Dispensing outlets which have previously been formed may be supplied by a rotary disc 21 upon which they may be placed either by hand or by means of any suitable conveyor. A continuous belt conveyor such as indicated at 22 may be used to carry the finished product from the soldering apparatus.

Briefly the preferred form of soldering apparatus, which is illustrated in the accompanying drawings comprises a table 30, having circular shaped top portion 31, which is supported by legs 32 and suitable cross members 33. The table 30 may be provided with rails or raised portions 34 along which the cans may be carried. The can bodies 12 are carried to the apparatus by a belt 15 and may abut a positive stop 16, which is adapted to retain the can bodies in a position where they may be forced across the conveyor belt onto the raised portion 34 of the table 30 by means of a plunger bar 17. The frame 30 may also support a rotary operating head 35 comprising a series of coordinated mechanisms 23, adapted to pick up previously formed dispensing outlets, one form of which is indicated at 14.

Figure 4:
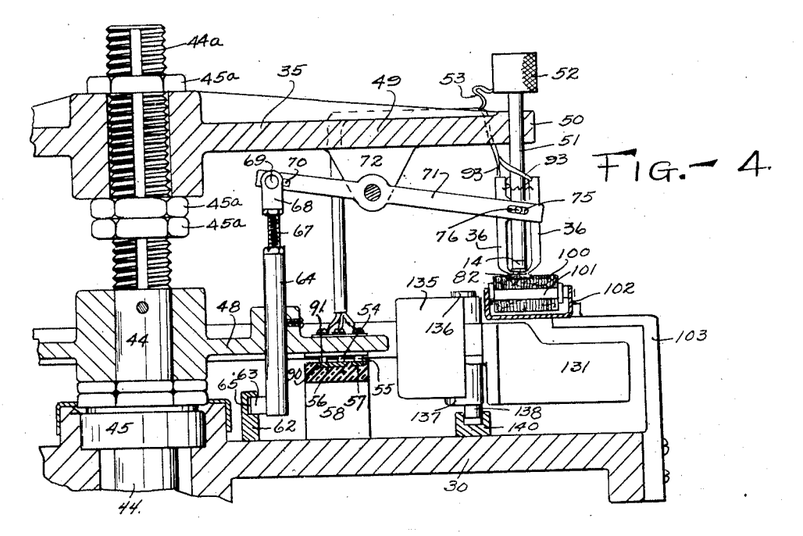
Figure 5:
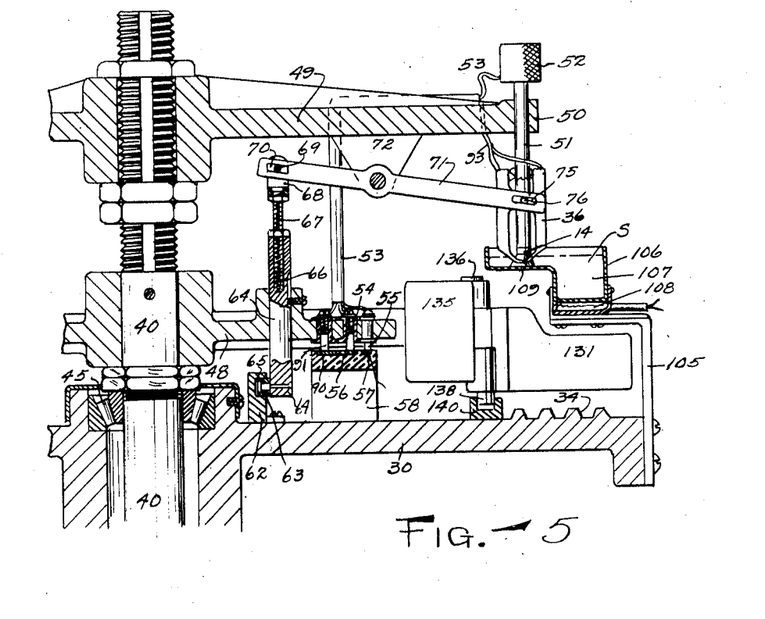

The outlet 14 may be held by one of the mechanisms 23 of the rotary head and partially emersed, first in a flux as illustrated in Fig. 4 and then in molten solder as illustrated in Fig. 5. The outlet 14 is then carried by the rotary head into the position illustrated in Fig. 6 where it is directly above a previously formed opening 14a in a can body 12, which has been supplied to the table 30 by the conveying mechanism 10. The can body is then accurately positioned with reference to the outlet and is swept along the raised portion by the head 35. Both the can bodies and the outlet members are carried by the head at the same rate of speed, the outlet member 14 being directly over the opening 14a in the can body. The outlet member is then caused to be lowered into a position in contact with the can body as for example Fig. 1.

Suitable soldering irons such as indicated at 36 and which may be heated by means of individual electric heating units, are included in the mechanisms 23 carried by the rotary head 35. These irons are caused to contact with the outlet member immediately after the latter is picked up by the mechanisms 23 thereby centering the outlet member with respect to the rotary head. The irons 36 are adapted to heat the outlet member while the latter is being subjected to the flux and molten solder. The tips of the soldering irons are permitted to dip in the molten solder when the latter is applied to the outlet member in order that they may be properly tinned and to maintain the outlet member in its position with respect to the head 35. The irons are held in contact with the outlet member until the latter has reached its position in its respective can body and until the solder on the outlet member has fused with that on the can body. Suitable means are then provided to withdraw the soldering irons from contact with the outlet member, the latter being retained in position on the can by the mechanisms.

A jet of cold air may then be forced on the joint between the can and the outlet member, chilling the solder and securing the outlet member to the can. The outlet member may then be released from the mechanism and subsequently the can body may be released and discharged from the soldering apparatus onto a suitable conveyor such as is indicated at 22.

The soldering apparatus and its associated mechanism will now be described in detail: Mounted on one of the frame members 33 is a motor 40, which cooperates with a gear reduction unit indicated at 41 to drive an idler gear 42, which in turn meshes with a driving gear 43, rigidly secured to the lower end of a vertical shaft 44. The shaft 44 may be rotatably supported by means of bearings 45 carried by a centrally located boss in the table 30. The bearings 45 preferably lie substantially below the surface 31 of the table. The shaft 44 is adapted to carry a rotating head 35 which supports the mechanism 23. The head 35 may comprise a pair of spiders 48 and 49, which are drivingly secured to the shaft 44. The spider 49 may be secured to threaded portion 44a of the shaft 44 in such a manner that it may be raised or lowered to adjust the head for different heights of can bodies. Lock nuts 49a may act to retain the spider 49 in position on the shaft 44.

The spider 49 may have a plurality of outwardly extending arms 50 which may carry slidably mounted magnet bars 51. Each magnet bar 51 may be provided with an individual energizing coil 52. The latter may be energized by means of wiring 53 which leads through the rotary head to brushes 54 and 55 (see Fig. 5). The brushes 54 and 55 are carried by the spider 48 and spring pressed against the stationary contact bars 56 and 57 held in place on the stationary table 30 by a suitable bracket 58 made of an insulating material (see Fig. 5).

The magnet bars 51 may be raised and lowered by means of a cam rail 62 rigidly secured to the stationary table 30. Rollers 63 are carried by slide bars 64, which are slidably mounted in the lowermost spider 48 and coact with a recess 65 in the cam rail to raise and lower the bars 64. The bars 64 are provided with threaded bores 66 adapted to receive threaded members 67, which are rotatably secured to yokes 68 which carry pins 69 adapted to coact with slots 70 in one end of levers 71 which are pivoted, intermediate their ends, to depending ears 72 on the arms 50 of the spider 49. An adjustment between the cam rail 62 and each lever 71, by reason of the threaded connection 66 and 67, is provided so that the position of the lever 71 with respect to the spider 49 will remain constant when the latter is raised or lowered to accommodate different can bodies of different heights. The levers 71 may be connected at their outer ends by means of slots 75 in the levers coacting with pins 76 which are adapted to pass through slots 77 in the magnet bars 51 and are pivotally connected to soldering irons 36.

It will thus be seen that as the bar 71 is raised and lowered, due to the action of the cam 62, that the lever 71 will be rocked, thereby raising or lowering both the soldering irons 36 and the magnet bar 51. It is also seen that the slide bar 64 may be lengthened or shortened to accommodate the raising or lowering of the spider 49 so the different heights of can bodies may readily be used in connection with the apparatus.

Figures 12, 14:
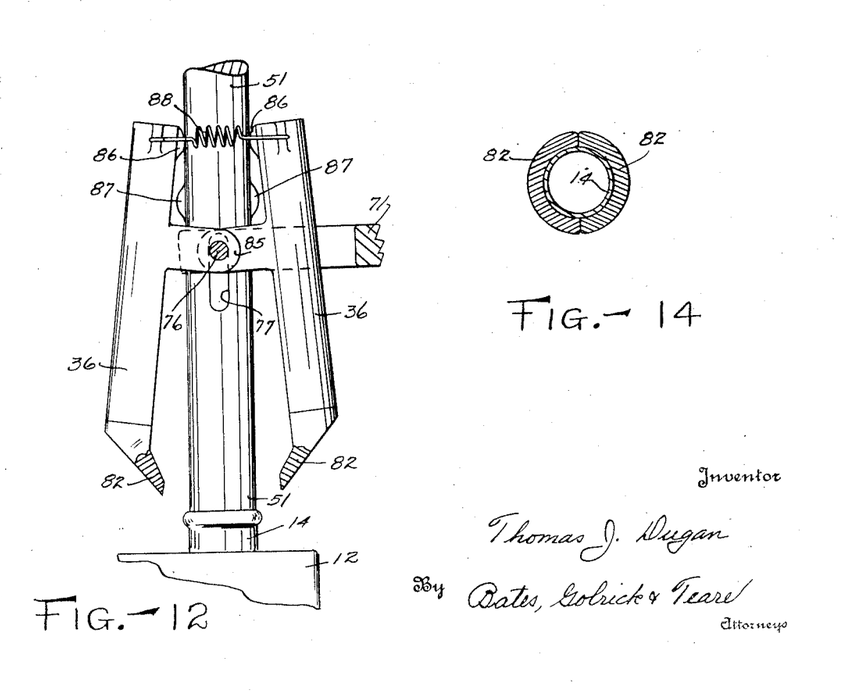
Fig. 12 is a side elevation of the iron shown in Fig. 11 but in a different operating position.

The soldering irons 36 may comprise a pair of hollow bars 80 which may be adapted to retain electrical heating elements 81. The bars 80 have tips 82, preferably of copper or other similar metal which are adapted to completely encircle the outlet member 14 (as shown in Fig. 14). In order that the different shaped outlet members may readily be accommodated by the apparatus, I prefer to secure the tips 82 to the irons 80 by means of set screws 83, in such a manner that the tips may be readily replaced. The soldering irons 80 have inwardly projecting ears 85 which carry the pin 76. The irons 80 have at their upper portion a cam 86 which is adapted to coact with a cam 87 carried by the magnet bar 51 which lies between the bars 80. A spring 88 serves to retain the cams 86 in contact with the magnet bar 42.

It will be seen that when the outer portion of the lever 71 is in its lowermost position and when an outlet member 14 is retained in place at the lower end of the magnet bar 51 and such outlet member is resting upon a can body 12, that the weight of the magnet bar 51 will tend to keep the outlet member 14 pressed downwardly upon the can body. In this position the cam members 86 and 87 are in contact with each other holding the tips 82 of the irons in close contact with the outlet member 14. It will also be seen that as the lever 71 is raised it carries with it the pin 76 causing the irons 36 to move with the pin. By reason of the slot 77 in the bar 51 the initial movement of the bar 71 will not affect the magnet bar 51. In this way the irons 36 may be removed from the outlet member 14, while the magnet bar 51 is retained by its weight in position on the can body until such time as the solder may be sufficiently chilled to cause the outlet 14 to be retained in place on the can body 12. A further upward movement of the arm of the lever 71 will raise both the soldering arms 36 and the magnet rod 51 which has previously been deenergized by reason of the brush 54 being out of contact with the bar 56 which is cut away at the point. Both the bar and the irons will then be clear of the can body.

Figure 3:
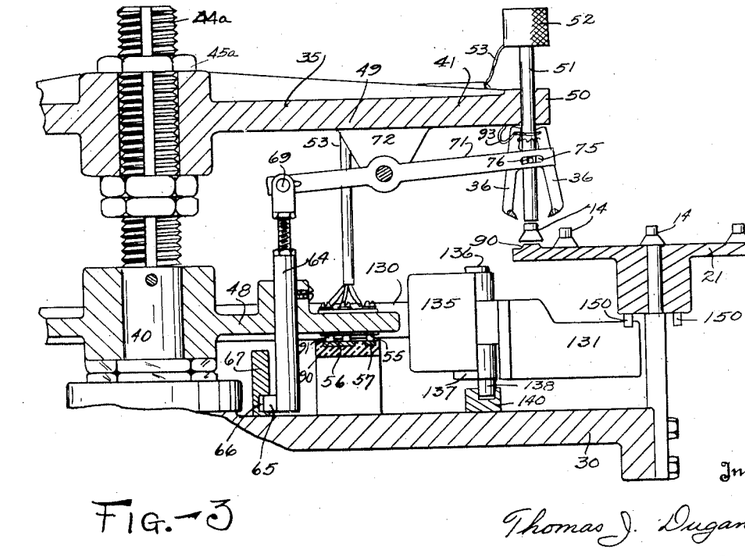
Figs. 3, 4, 5, 6, 7, 8 and 9 are fragmentary vertical cross sections illustrating the apparatus at different stages of operation, these sections are indicated by the lines 3—3, 4—4, 5—5, 6—6, 7—7, 8—8, and 9—9 respectively.

To supply the apparatus with outlet members, I prefer to use the following mechanism: Mounted on the frame 30 is a rotatable disc 21 (see Figs. 1 and 3). This disc carries a plurality of bosses 90, which are adapted to retain in place on the disc the previously formed outlet members 14. The latter may be supplied to the disc either manually or by some suitable conveyor mechanism. When a magnet bar 51 comes in position over the disc 21 it overlies an outlet member 14. At this time, the coil 52 is energized, thereby causing the magnet bar 51 to lift an outlet member 14 clear of the disc 21 and retain it in position on the lowermost surface of the bar 51 (see Fig. 3).

The apparatus for supplying flux to the outlet member will now be described. As the head is rotated in a counter-clockwise direction (see Fig. 1) the lever 71 is rocked causing the magnet bar 51 to be lowered into a position where it may contact with a felt roller 100, adapted to carry a suitable soldering flux. As the bar 51 is lowered the irons 36 are likewise lowered and by reason of the cams 86 and 87 the tips of the soldering irons are brought into contact with the outlet member 14, centering it on a magnet bar 51 and retaining it in position while it is in contact with the roll 100.

The roller 100 is secured to a shaft 101 which is rotatably mounted in a tray 102, which is carried by a stationary bracket member 103, rigidly secured to the stationary table 30. The trap 102 may carry any suitable soldering flux such as soldering acid or the like. It will be seen, that, as the outlet 14 contacts with the roller 100 the lower portions of the outlet member will be coated with the flux.

The outlet member 14 is now in condition to be tinned or dipped into the solder. The solder may be supplied to the outlet by the following mechanism: Mounted on a stationary bracket 105, carried by the frame 30 is a pan 106 which may contain molten solder. The portion of the pan 106 which underlies the arms 50 and their associated magnet bars 51 is comparatively shallow as at 109, so that the outlet member 14 may be slid along the bottom of the pan, emersed to a predetermined height in the molten solder "S". To retain the solder in the pan 106 at a predetermined temperature, the pan may be provided with a well portion 107 adapted to hold a comparatively large amount of solder which may be heated by an electric heating element 108.

As the head 35 carries the magnet bars 51 and their associated soldering irons 36 they are caused to raise by reason of a raising of the levers 71 due to the action of the cam 65 and its associated mechanisms. This retains the outlet member 14 in a raised position where it may clear the upper edges of the solder pan 106. A continued rotation of the head 35 carries the outlet member 14 into position over the pan 106. The lever 71 is then lowered, causing the outlet member 14 to come in contact with the lower surface 109 of the solder pan 106. While in this position the outlet member is retained in place on the magnet bar 51 by reason of its being gripped by the tips 82 of the soldering irons 36. Immediately before the rotary head 35 has carried the outlet 14 to a point near the forward edge of the solder pan 106 the lever 71 is actuated by the cam rail 65 and its associated mechanism to raise the outlet member 14, so that it may clear the solder pan. While in this raised position the outlet 14 will also clear a can body 12 which is being supplied to the table 30 by the mechanism 10.

Figure 1:
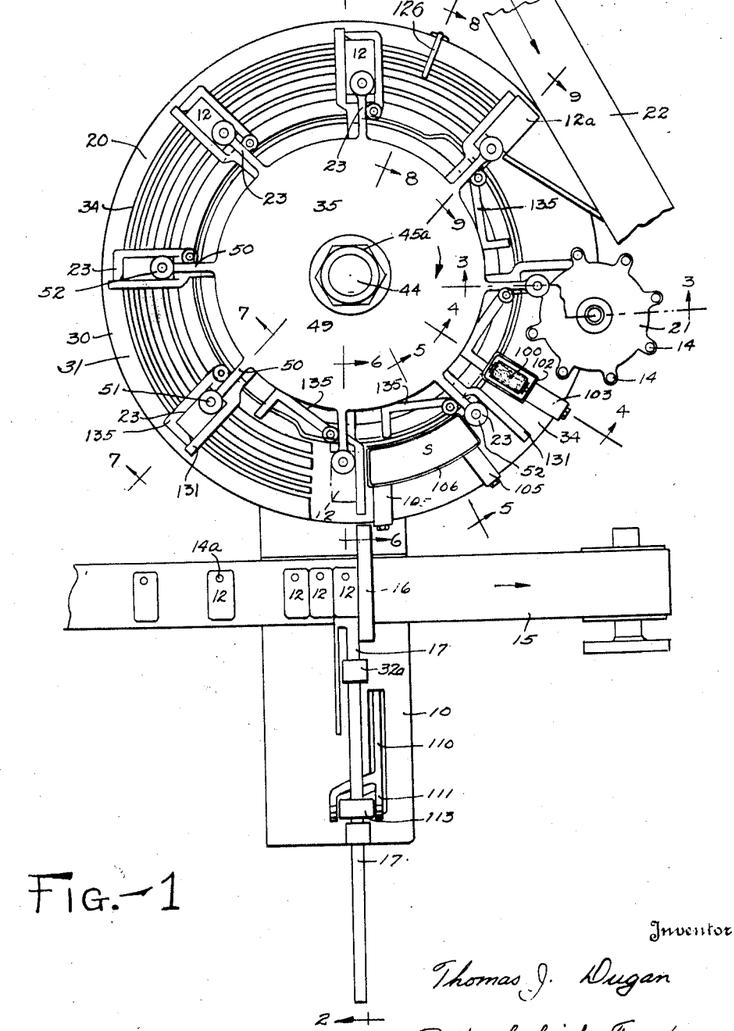
Fig. 1 is a plan of an embodiment illustrating a preferred form of my invention.
Figure 2:
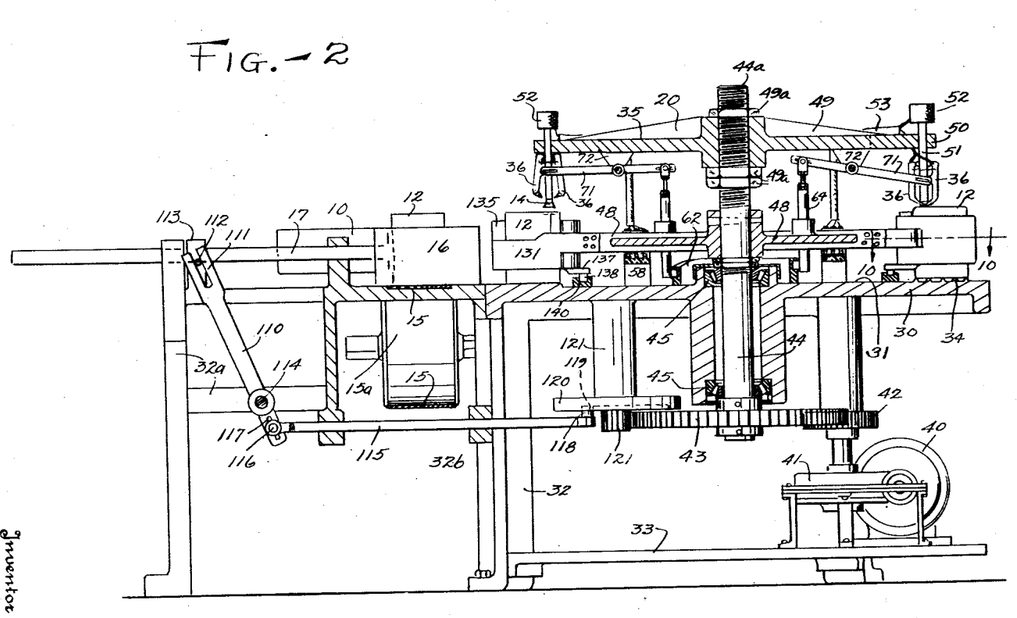
Fig. 2 is a vertical section indicated on the line 2—2 of Fig. 1.

As heretofore described the can bodies 12 which have previously formed openings 14a, may be progressed along a conveyor belt 15 and caused to come to a stop by a stationary abutment 16, in a position where they may be forced laterally across the belt and onto the table 30 by means of a plunger bar 17, as shown in Figs. 1 and 2.

It is necessary that a can be fed to the table 30 at predetermined intervals of time. To accomplish this I prefer to supply the following mechanism: A plunger 17 is slidably mounted in a frame 32a and is operated on by means of a lever 110, which is yoked at its upper end as at 111, and adapted to coact with a pin 112 carried by a block 113, rigidly secured to the bar 117. The lever 110 is pivotally secured intermediate its ends to a frame member 32a as at 114. A rod 115 is slidably mounted on a frame member 32b and coacts with the lower end of the lever 110 by means of a pin 116 carried by the bar 115, cooperating with a slot 117 in the lever 110. The other end of the bar 115 carries a roller 118 adapted to coact with a cam slot 119 in a rotary cam plate 120. The cam plate 120 is rotatably mounted on a downwardly projecting boss 121 of the table 30. Rigidly secured to the cam plate 120 is a spur gear 121, which meshes with the driving gear 43 of the operating head 35 of the soldering apparatus.

In the embodiment illustrated, the operating head is shown as having eight sets of mechanisms 23. It therefore is evident that a can must be fed to the table 30, eight times for each revolution of the head 35. This is readily accomplished by reason of the pinion 121, which drives the operating cam 119 of the feeding mechanism, being of a ratio of eight to one with the operating gear 43. It is evident from the foregoing description that a cam may be fed to the table 30 at any predetermined time and in timed relationship to the rotation of the operating head 35.

As the can body 12 is fed to the table 30 it is caused to be gripped by mechanism associated with the spider 48 and accurately positioned with reference to the outlet member 14, in such a manner that the outlet member 14 is held directly over a previously formed opening 14a of the can body 12 in order that a lowering movement of the outlet member will cause it to contact with the opening 14a of the can.

Immediately after the can body 12 has been gripped by mechanism associated with the spider 48 of the head 35, the magnet bar 51, which at this time is holding the outlet member 14 in a raised position, is caused to drop by reason of the cam 65 acting on the bar 71 by means of the mechanism heretofore described. This causes the outlet member 14 to be lowered in place on the can body 12 directly over the opening 14a in the can body.

Figure 6:
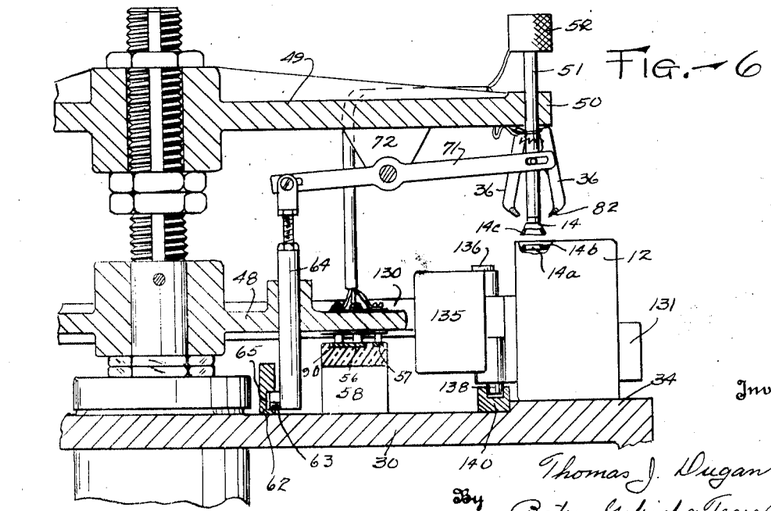
Figure 7:
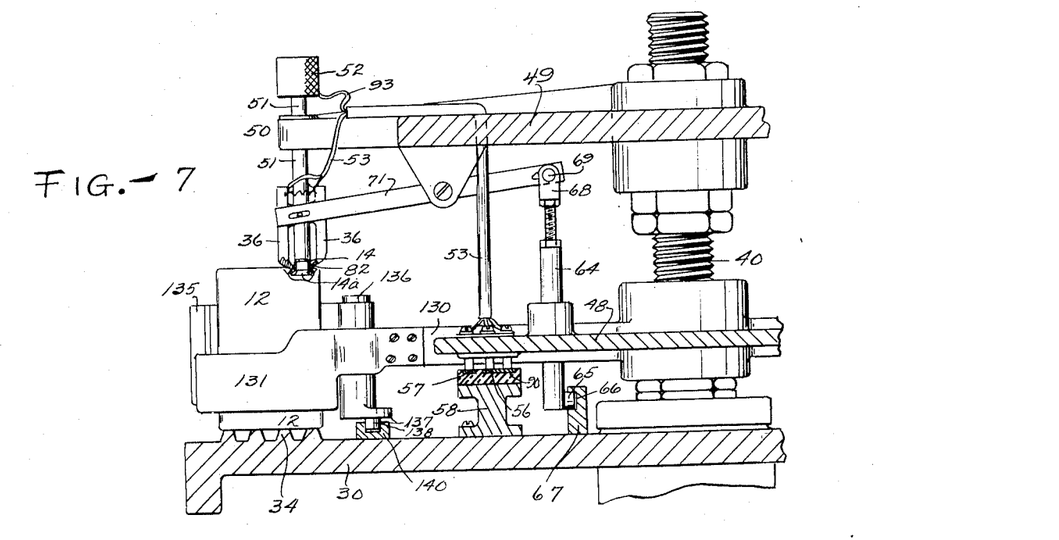

As shown in Fig. 6 the can body 12 has a previously formed opening 14a in the top thereof, the metal adjacent the opening being formed into an outwardly projecting tapered flange 14b adapted to fit inside of a similar flange 14c previously formed on the outlet member 14. As the magnet bar 51 is lowered it positions the outlet member 14, so that the inner bevelled surface 14c of the outlet member contacts with the outer bevelled surface 14b of the can body. This movement also causes a lowering of the soldering irons 36 which are caused to come in contact with the outlet member 14 by reason of the cams 86 on the irons contacting with the cams 87 on the magnet bar 51, thereby causing the lower ends or tips 82 of the magnet to be drawn together enveloping a portion of the outlet member 14 in close proximity with the point of contact with the can body.

Figure 8:
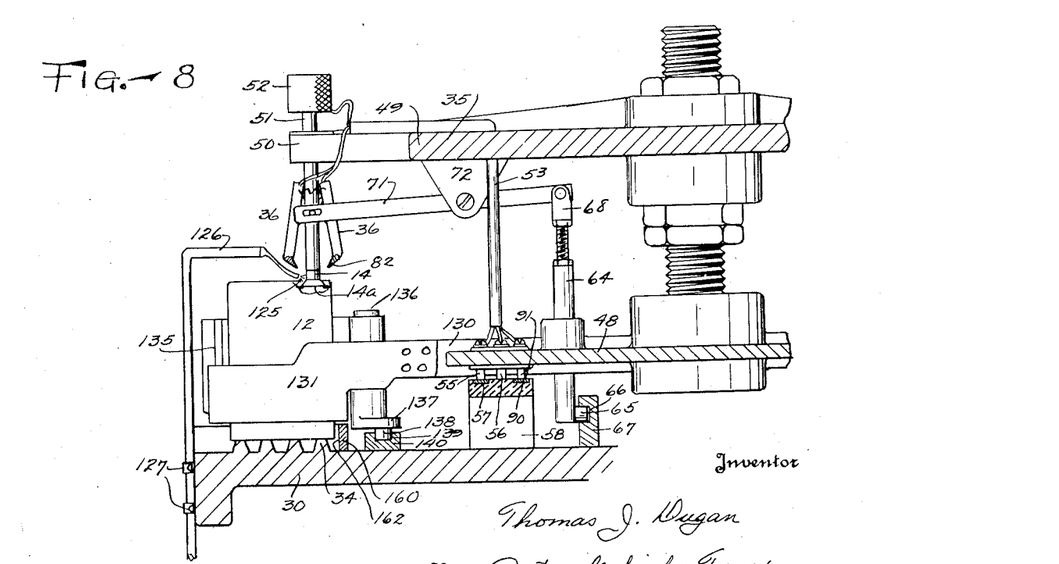

It is desirous that the soldering irons 36 be heated at all times when the apparatus is in operation. To accomplish this the bracket 58 carries continuous contact bars 90 and 57, which coact with brushes 91 and 55 slidably mounted in the spider 48. The brushes are connected to the irons 36 by means of suitable wiring 92 and 93 (as shown in Figs. 3 to 9 inclusive). It is therefore evident that the solder which has been placed on an outlet member 14 will fuse with the tinned surface 14b of the can body 12. The irons 36 may remain in contact, for a comparatively long part of the cycle of operation, with the outlet member 14 while the latter is in position on the can body 12, to insure proper fusing of the solder with the tinned surface of the can body. In the form illustrated I have shown this operation as consuming approximately a quarter of a revolution of the head 35. At the end of this part of the cycle of operation the lever 71 may cause the soldering irons 36 to be raised and drawn out of contact with the outlet member 14. However, I prefer to permit the magnet bar 71, which at this time is deenergized to remain lowered, resting on the outlet member 14, and retaining the latter member in place on the can body, while a jet of cold air indicated at 125 in Fig. 8 is forced against the soldered joint 14e between the can body and the outlet member.

Any suitable means may be used to supply the air and conduct it to a position where it may be forced in a jet upon the can. In the embodiment shown a tube 126 which is so positioned as to clear the moving parts of the head 35 and the can body 12 conveys air from any suitable compressor (not shown) to the can body. The tube 126 may be secured to the frame 30 by any suitable means such as the clips 127.

Immediately after the soldered joint between the can body and outlet member has become chilled, the magnet bar 71 may be caused to raise by means of the cam 65 and its associated mechanism. The finished can 12a is then in position to be discharged from the mechanism in a manner hereinafter to be described and the arm 50 with its associated mechanism is then free to enter another cycle of operation.

The gripping means for positioning the can body 12 must be of such a nature that the body 12 will be accurately positioned on the head so that the opening 14a and the bevelled rim 14b of the can body will be positioned directly below one of the magnet bars 51 and its associated outlet member 14. A slight clearance is allowed between the bevelled surface 14b of the can body and the bevelled surface 14c of the outlet member, to care for small variations in size of the can bodies. However, the can bodies are so formed that variation in them seldom exceeds one or two thousandths of an inch. This of course, is readily taken care of in the clearance allowed between the outlet member and the raised portion 14b of the can body. However, it is necessary that the cans be accurately positioned in order that the outlet members may readily seat upon the flanges 14b of the can bodies. This may be accomplished by a gripping mechanism which may be associated with the rotary head 35.

In the embodiment illustrated I have provided the spider 48 with outwardly extending arms 130 which are adapted to substantially underlie the arms 50 of the upper spider member 49. Removably secured to each of these arms is an extension 131 which is adapted to overlie the raised portion or slideway 34 of the table 30 and underlie the solder pan 106 as well as the flux roller 100, as shown in Figs. 4 and 5.

When the can body is rectangular as is illustrated in the drawings the member 131 may be L shaped to contact with two adjacent sides of the can in such a manner as to restrict the inward movement of the can by a surface 132 and to force the can to slide along the raised portion 34 of the bed by reason of a surface 133 of the extension 131. The member 131 is shown as being removable so that it may be changed to accommodate cans of various sizes and shapes.

Figure 10:
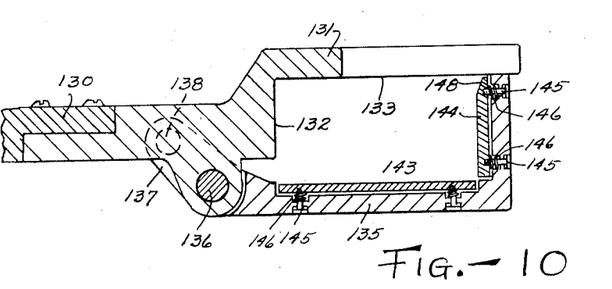
Fig. 10 is a horizontal section illustrating a form of can body holding means as indicated by the line 10—10 on Fig. 2.
Figures 11, 13:
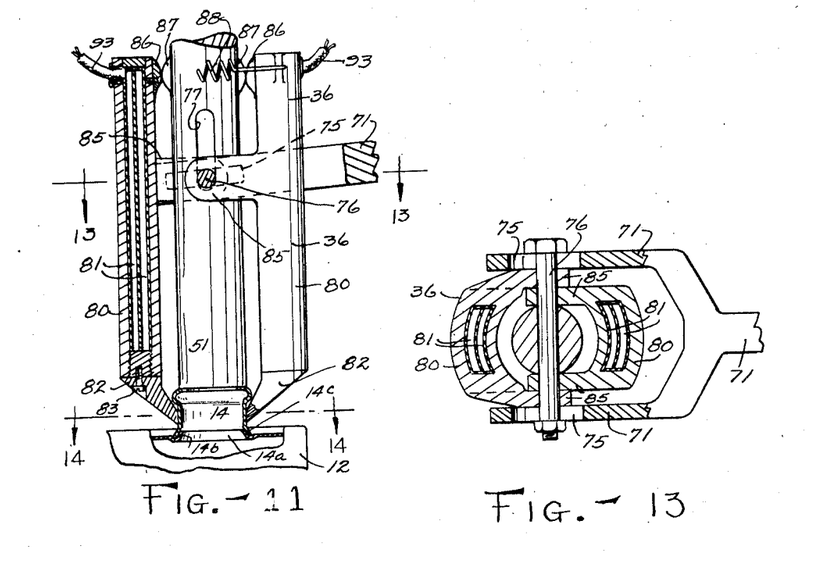
Fig. 11 is in detail, partially in section, of the soldering irons and certain of its associated parts.
Figs. 13 and 14 are horizontal sections indicated by the lines 13—13 and 14—14 on Fig. 11.

To retain the can in contact with the surfaces 132 and 133 of the extension 131 I may provide a similar L shaped member 135 which is adapted to contact with the adjacent sides of the can opposite to those which bear against the member 131 to force the cam against the latter member. As illustrated, the member 135 may be pivoted to the arm 131 by a pin 136 and may have an ear 137 adapted to carry a roller 138 which coacts with a cam 140 rigidly secured to the base 30. It will be seen that as the arm 130 is rotated by reason of the rotation of the spider 48 and the shaft 44 the cam roller 138 will be caused to follow a cam slot 139 in the cam 140. This cam is arranged in such a manner as to swing the arm 135. This is best illustrated in Figs. 10 and 1. The cam slot 139 is so arranged as to separate the members 131 and 135 and hold them separated until a can, which has been forced from the conveyor 15 onto the raised portion or slideway 34 of the table 30 contacts with the extension 131 at which time the cam 140 will cause the member 135 to swing towards the can, forcing it into position against the faces 132 and 133 of the extension 131. The can is retained in this position until the soldering operation is complete and then the magnet bar 51 with its associated soldering irons are withdrawn from contact with the can and its associated outlet member. At this time the arm 135 may be caused to swing open by means of the cam 140 and remain in this position until it has again picked up another can.

The indexing of the disc 21 may be accomplished in any suitable manner. I prefer to provide the disc 21 with depending lugs 150 which may project into the path of the extensions 131 of the spider 48. The lugs 150 are spaced apart the same angular distance as are the bosses 90 which carry the outlet members 14, and are so arranged that when a magnet bar 51 has lifted an outlet member 14 from the disc an extension 131 which underlies the aforesaid magnet bar will contact with one of the lugs 150 and rotate the disc 21 an angular distance equal to that between the outlet members 14 which are carried by the disc, thereby indexing the disc and bringing another outlet member in position to be picked up by the next succeeding magnet bar 51.

In order that slight discrepancies in the size of the can bodies may be taken care of and at the same time insure that the cams will be positively gripped between the arms 131 and 135, I prefer to have the inner faces 142 and 143 of the member 135 resilient. This may be accomplished by providing the member 135 with face plates 144 and 144a which are held in place by limiting screws 145 slidably mounted in member 135. Suitable springs such as shown at 146 may be provided to keep the members 144 and the member 135 normally separated. These springs need be of only sufficient strength to cause a positive gripping of the can. The surface 127 of the plate 144a may be bevelled as at 148 to prevent jamming of the can body by the plate 142. It is evident from the foregoing descriptions that this will positively grip the can body in a predetermined position with relation to the outlet member 14.

The completed product may be discharged from the soldering apparatus by any suitable means, which may act on the can after the soldering operation has been completed, the magnet bar 51 with its associated soldering irons 36 has been withdrawn from contact with the member 14 and the gripping arm 135 has been withdrawn from contact with the can by means of the cam 140, as heretofore described.

Figure 9:
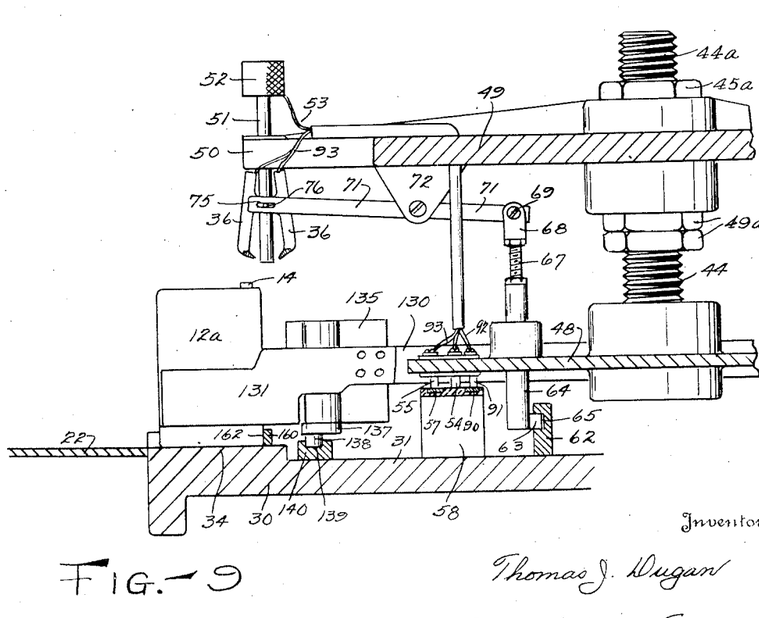

In the embodiment shown a cam rail 160 is rigidly secured to the table 30 and as the completed can 12a is carried along the raised portion 34 of the table by one of the arms 131 the lower part of the can contacts with the rail 160 and a further rotation of the arm 131 causes the can to be forced outward along the surface 162 of the rail 160 and onto the conveyor indicated at 22 (see Figs. 1 and 9).

It will be seen from the foregoing description that I have provided an apparatus which will feed can bodies to a soldering mechanism at predetermined intervals of time and which will solder an outlet member in position on the can body and effect a discharge of the finished can. It will be noted that this mechanism is so adapted that cans of different sizes and shapes may be operated on and that the mechanism is capable of operating at a comparatively high rate of speed thereby saving much time and labor in the manufacture of cans. It is also evident that I have provided a mechanism which is adapted to automatically efficiently solder outlet members of different shapes and sizes, as well as handles and pouring spouts, onto the can bodies without necessitating manual operations being performed thereon.

I claim:

1. In a mechanism of the class described, the combination of a rotary head, means to rotate said head continuously, means for feeding containers to the head, feeding means to feed a metallic member to the head, and a soldering apparatus including a soldering iron carried by the head to solder a metallic member to a metal part of the container.

2. In a mechanism of the class described, the combination with a rotary head, of means for feeding component metallic parts of containers to the head, means associated therewith to relatively assemble the component parts, means for thereafter soldering the component parts together, and wherein said last named means includes a heating unit carried by the head.

3. In a mechanism of the class described, the combination in a soldering mechanism, of a rotary head, means adapted to convey metal containers to said head, means associated with the head and adapted to carry a metallic member to a predetermined position in contact with the container, a plurality of soldering means each including a heating element associated with the head and adapted to solder the metal member and the container together, and discharge means associated with the head to discharge the completed product.

4. In a mechanism of the class described, the combination with a soldering apparatus of a plurality of soldering mechanisms, means adapted to convey containers to the soldering mechanisms, means associated with the soldering mechanisms adapted to place metallic members in a predetermined position on the containers, and means including a heating element in each soldering mechanism adapted to solder a metallic member to a metal part of a container.

5. In a mechanism of the class described, the combination with a soldering mechanism including a soldering iron, of means adapted to convey metallic members to the iron, and means associated with the soldering mechanism and adapted to place the metallic members in a predetermined position on a container while they are retained in contact with the iron, thereby soldering the metallic member to a metal part on the container.

6. In a soldering apparatus, the combination, with a soldering mechanism of means adapted to receive a metallic member, feeding means adapted to feed metallic members to the soldering mechanism, means including a heating element associated with the soldering mechanism adapted to receive a second metallic member, a conveying apparatus associated with the soldering mechanism adapted to convey the last named metallic member to the soldering mechanism, means included in the soldering mechanism to bring both metallic members in contact with each other in a predetermined relationship, and a soldering means associated with said soldering mechanism adapted to apply solder to one of the members before they are brought in contact.

7. In a mechanism of the class described, the combination with a soldering apparatus, of a rotary member, means to rotate the rotary member continuously, conveying means adapted to feed metallic containers to the rotary member, conveying means associated with the soldering apparatus and adapted to feed a metallic member to the rotary member, means associated with said rotary member adapted to automatically bring the metallic member and the container to predetermined positions relative to said rotary member, means acting thereafter to bring the metallic member into contact with the container, and means associated with said rotary member adapted to solder said metallic member to the container without interrupting the rotary movement of said rotary member at any stage of operation of the various mechanisms.

8. In a mechanism of the class described the combination of a frame including a stationary table, means adapted to feed containers to the table, a rotary head supported by the frame, means to rotate the head continuously, means associated with the rotary head adapted to progress the containers along the table, means associated with said rotary head adapted to receive a dispensing member, means adapted to bring a container and a dispensing member together in a predetermined position with respect to each other, and said last named means adapted to rigidly join the can body to the dispensing member without interrupting the rotation of the head.

9. In a mechanism of the class described the combination of a frame, a rotary head supported on the frame, means operative to continuously rotate the head, a plurality of mechanisms carried by the rotary head and adapted to receive metallic containers, means carried by said rotary head to receive metallic dispensing members, means adapted to bring a metallic container and a dispensing member together in a predetermined position with respect to each other, and means adapted to solder a connection between the can body and the dispensing member without interrupting the rotation of the head.

10. In a mechanism of the class described the combination of a frame, a rotary head supported by the frame, means to rotate said head continuously, means associated with the rotating head adapted to receive can bodies, means carried by said rotating head adapted to receive a metallic dispensing member, means adapted to bring a can body and the dispensing member together in a predetermined position with respect to each other, means carried by said head including an electrically heated soldering iron adapted to solder a connection between the can body and the dispensing member, and discharge means adapted to discharge the finished product from the head.

11. In a soldering apparatus, the combination with a rotary head, of means associated with the head adapted to receive a metallic dispensing member, means adapted to apply a coating of flux to a portion of said member, means adapted subsequently to apply a coating of solder to said member, means adapted to bring said member into contact with a can body, and means including a heating element carried by said head and adapted to solder said member in place on the can body.

12. In a soldering apparatus in combination with a rotary head adapted to receive a metallic dispensing member, means adapted to apply a coating of solder to a predetermined portion of said member, means adapted to bring said member in contact with a can body and means adapted to solder said member in place on the can body said last-named means including a plurality of heating elements carried by said head.

13. In a soldering apparatus in combination with a movable head adapted to receive a metallic member, means adapted to apply a coating of flux to a portion of said member, means adapted to bring said metallic member in contact with a metallic can body, and means including a heating element carried by said head and adapted to solder said member to the can body.

14. In a can manufacturing machine the combination of a frame, a rotary head supported by the frame, mechanism acting in timed relationship with the head adapted to supply can bodies to the head, and magnetic means associated with the head adapted to receive metallic outlet members, means carried by the head to position a metallic member with respect to a can body, means associated with said head adapted to position the outlet member in contact with the can body, and means including an electrically heated soldering iron adapted to solder a connection between the can body and the outlet member.

15. In a can manufacturing machine the combination of a frame, a head supported by the frame, a plurality of mechanisms carried by the head, means adapted to supply can bodies to the mechanisms, means adapted to convey dispensing outlet members to the mechanisms and means associated with the head adapted to position the outlet members with respect to the can bodies, a soldering iron included in each of the mechanisms adapted to solder a connection between the can body and the outlet member, and means associated with the frame adapted to discharge the can body from the mechanisms.

16. In a soldering apparatus, a plurality of can receiving mechanisms, a plurality of container parts receiving mechanisms, means to assemble said parts, and soldering means including an electrically heated soldering iron associated with each of the receiving mechanisms adapted to solder a part to a can.

17. In a machine for soldering tin container parts together in a predetermined relation, respective feeding means for such parts, and a soldering mechanism including means to assemble the correlated parts from such feeding means and solder the correlated parts together in succession while conveying the containers to a discharge position and without interruption of said conveying movement.

18. The method of soldering two container parts together consisting of the step of conveying and placing one part to and upon another by the use of electro-magnetic influence to hold the conveyed part during the soldering operation and soldering the parts together.

19. In a soldering machine, means to bring two container parts together including a magnet to pick up and placing one of said parts in predetermined relationship to a correlated part and retain it in such position, and means for soldering the two parts while held together as aforesaid.

20. In a machine comprising a bed, a carrier movably mounted on the bed and means for driving the same, means on the carrier adapted to receive the respective component parts of a complete container from respective stations, said means adapted to relatively assemble such parts while the parts are retained on the carrier, and a soldering mechanism also mounted on the carrier arranged to solder such assembled parts together.

21. In a machine of the class described, a movable carrier and means for driving the same, respective conveyers for two container parts adapted to be soldered together to form a complete container, a soldering apparatus supported by the carrier and movable therewith, and means on the carrier associated with the soldering apparatus arranged to be driven by the said driving means and adapted to receive the parts from the respective conveyers and assemble them successively for the soldering apparatus to operate thereon.

22. In soldering apparatus the combination of a plurality of mechanisms, each including a soldering iron, each mechanism also including means adapted to receive a metallic part, means to apply flux to the part, means to apply molten solder to the flux treated part, means to receive another metallic member, means to assemble the two members, and subsequently acting means to solder a connection between them, with means to cause said mechanisms to perform each of said operations in consecutive order and whereby said mechanisms may act simultaneously to perform different operations on different assembly of parts.

23. In a soldering machine a rotating member, a plurality of part receiving mechanisms carried adjacent the periphery of said rotary member, a flux applicator disposed along the path of movement of said mechanisms, a solder applicator disposed along said path, means carried by said rotary member to assemble a plurality of parts in a predetermined relationship, and a soldering means included in each of the mechanisms adapted to solder the assembled parts together.

In testimony whereof, I hereunto affix my signature.

THOMAS J. DUGAN.